United States Patent [19]

Farber

[11] Patent Number: 4,523,993

[45] Date of Patent: Jun. 18, 1985

[54] PRECIOUS METAL RECOVERY APPARATUS

[75] Inventor: Mark I. Farber, Orange, Conn.

[73] Assignee: Resource Associates International Corp., West Haven, Conn.

[21] Appl. No.: 507,974

[22] Filed: Jun. 27, 1983

[51] Int. Cl.³ .............................................. B01D 33/06
[52] U.S. Cl. .................... 210/297; 210/315; 210/317; 210/380.1; 209/270; 266/170
[58] Field of Search ...................... 210/781, 380.1, 297, 210/315, 399, 317, 403; 266/170, 204; 209/268, 270, 198, 199, 350, 392

[56] References Cited

U.S. PATENT DOCUMENTS

| | | | |
|---|---|---|---|
| 2,306,091 | 12/1942 | Thorneloe | 210/380.1 |
| 3,827,985 | 8/1974 | Haan et al. | 210/380.1 |
| 4,119,542 | 10/1978 | Yamaoka et al. | 210/380.1 |
| 4,343,700 | 8/1982 | Daubman et al. | 210/380.1 |
| 4,371,436 | 2/1983 | Farber | 209/268 |
| 4,430,221 | 2/1984 | Spiewok | 210/380.1 |

Primary Examiner—Benoit Castel
Attorney, Agent, or Firm—Mattern, Ware, Stoltz & Fressola

[57] ABSTRACT

By providing an open-ended perforate vessel which is rotatable about its central axis and incorporates a removable filter element, a highly efficient easily employable precious metal recovery apparatus is achieved capable of removing precious metal from an aqueous carrier. Preferably, the perforate vessel is supportingly contained within a housing which receives the aqueous carrier after passage through the filter and delivers the aqueous carrier to a disposed area. In addition, the perforate vessel is preferably cylindrically shaped with holes formed throughout and the filter comprises a bag-like or envelope-like construction which is easily mounted about the walls of the vessel as well as easily sealed after filtration with the precious metal contained therein for delivery to a reclamation center.

8 Claims, 4 Drawing Figures

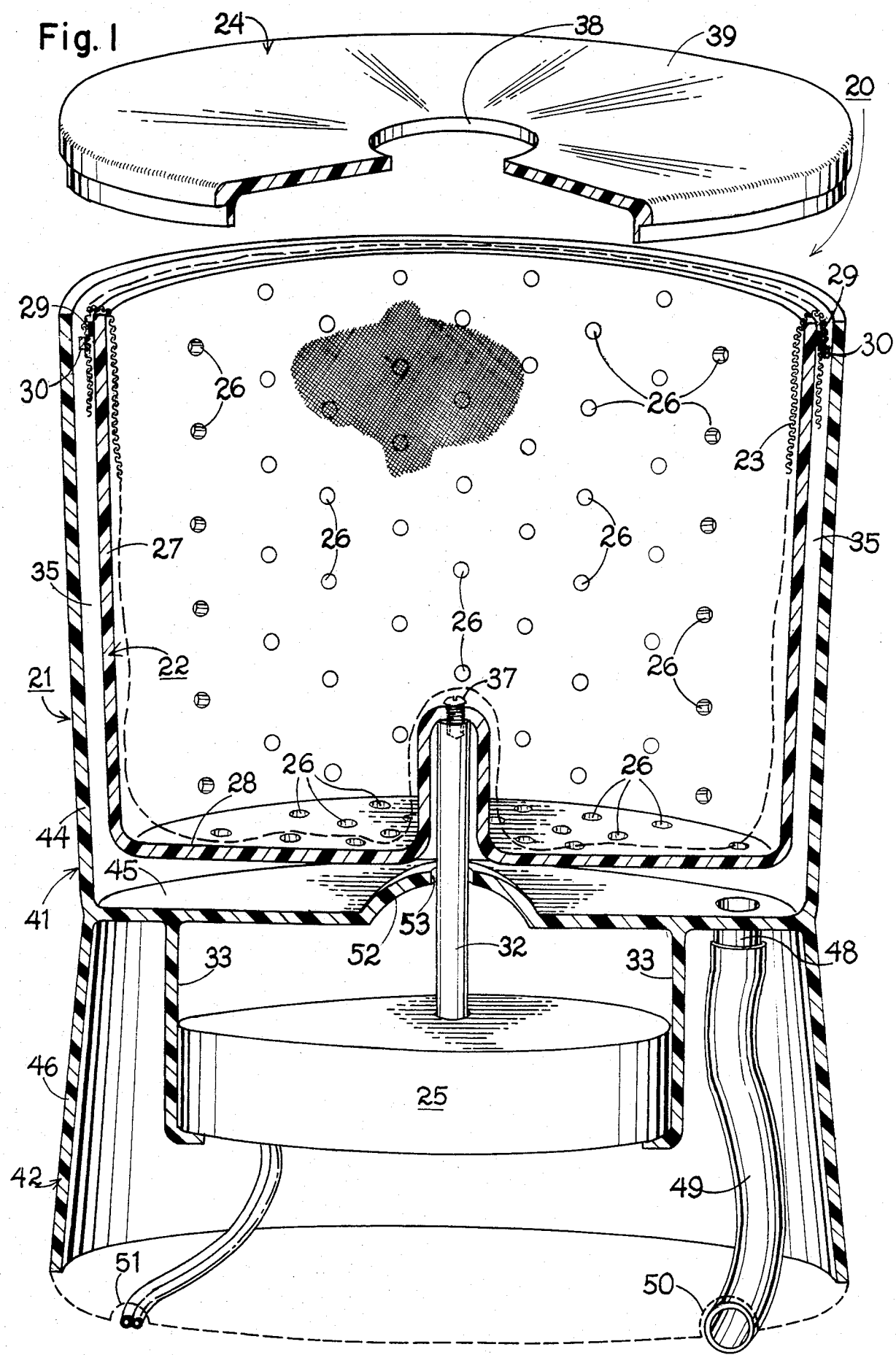

PRECIOUS METAL RECOVERY APPARATUS

TECHNICAL FIELD

This invention relates to systems for recovering precious metal and, more particularly, to recovering precious metal by non-reactive filtration.

BACKGROUND ART

With the increasing cost of precious metals, such as silver, gold, etc. added effort has been placed in the development of systems for recovering precious metals from solutions after the metals have been employed in a particular process. Typically such systems have found general acceptance in photography where silver salts are employed in the development process and remain in the spent photographic developing solution.

Although interest in recovering precious metals from these various solutions has long existed, most of the prior art systems require chemical reactions with the solutions in order to precipitate the precious metal from the solution, and thereby obtain its recovery. However, such processes are undesirable, due to the additional effort required by the user. Typically, the user must carefully measure various precise amounts of reaction-inducing chemicals, mix the chemicals into the precious metal-bearing solution and then conduct various processing steps to obtain the desired recovery.

In order to eliminate these undesirable chemical reaction recovery systems, some prior art filtration systems were developed. However, all of these prior art systems are costly and are usually heavy and complex to operate. In addition, many of these systems employ a chemically reactive filter that must be carefully watched to assure its proper operation.

One non-reactive filtration system is disclosed in my own U.S. Pat. No. 4,371,436. As disclosed therein, a multiple filter system is used wherein the liquid containing the precious metal is gravity fed through a plurality of non-reactive filter elements which removes finer and finer sized silver particles from the solution, with the fully filtered solution being delivered to a waste drainage port.

Although this prior art system does achieve a non-reactive filtration of precious metals from their solution, the complexity of this system is undesirable. In particular, a plurality of various filter elements are required, with each of the filter elements having progressively smaller micron sizes in order to achieve the desired result. Consequently, a plurality of various different size filter elements must be maintained in stock and must be inserted into the system in the proper sequence in order to keep the system operating correctly. Furthermore, it has been found that complete passage of the solution through the finer filter elements is not always achieved smoothly and effectively.

Consequently, it is a principal object of the present invention to provide precious metal recovery apparatus which effectively and efficiently filters precious metal from substantially all liquid solution, without requiring a reaction of the solution with chemicals or with the filter system.

Another object of the present invention is to provide precious metal recovery apparatus having the characteristic features described above which employs a single filter which is easily positioned in the recovery apparatus and quickly and easily removed therefrom when the desired filtration has been achieved.

Another object of the present invention is to provide precious metal recovery apparatus having the characteristic features described above which is easily used by untrained personnel, as well as highly portable and uncomplicated.

Another object of the present invention is to provide precious metal recovery apparatus having the characteristic features described above which is highly reliable, while also providing efficient and effective substantially complete filtration and retention of the desired precious metal.

Other and more specific objects will in part be obvious and will in part appear hereinafter.

SUMMARY OF THE INVENTION

The precious metal recovery apparatus of the present invention achieves the desired recovery of precious metals by passing a solution through a non-reactive filter which is mounted about the inside wall of a rotatable drum member. In the preferred embodiment, the rotatable drum member is retained within a support housing and is perforated throughout, by a plurality of holes formed in the walls thereof, in order to provide for the easy passage of the filtered solution from the inside of the drum to the outside of the drum, while retaining the precious metal in the filter area of the drum.

In the preferred embodiment, the precious metal recovery apparatus of the present invention is constructed with the support housing peripherally enveloping and supportingly retaining the rotatable drum in a manner which allows the drum to be continuously rotated for any desired time period. In this way, by first inserting the filter element about the inside surfaces of the perforated drum and then placing the solution into the filter-lined perforated drum, the drum can be rotated to achieve the desired filtration.

By employing the precious metal recovery apparatus of the present invention, centrifugal force is advantageously employed in order to attain optimum, forced filtration through small micron-sized filters, without requiring a filter system which must operate under high pressure.

By employing this unique construction, a system is achieved which attains all of the advantages of a filter system wherein the solution is passed through the filter under high pressure, while having none of the disadvantages of a pressurized system. By merely lining the inside surfaces of the perforated, rotatable drum with the desired filter elements, pouring the solution to be filtered into the drum, and then rotating the drum at the desired speed for the required time period, centrifugal force causes the solution to impinge upon the filter element and be forced through the filter. All of the precious metal having a size greater than the size of the filter is retained within the rotating drum, while all of the liquid is expelled. Once all of the liquid has been forced through the filter into the support housing, the drum rotation is stopped and the precious metal recovered is easily removed from the drum.

In the preferred embodiment, the rotatable drum comprises a cylindrically shaped vessel with one end thereof closed and the opposed end thereof open. In addition, the rotatable drum comprises a plurality of holes formed about the entire side wall and base thereof, in order to assure rapid passage of the liquid through the filter and out of the rotatable drum. With this construction, the perforated rotatable drum can be quickly and easily lined with the desired filter by merely positioning the filter about the inside, hole-containing surfaces of the drum through the open end thereof. Similarly, once the filtration process has been completed, the filter, as well as the precious metal, can be quickly and easily removed from the drum.

In the preferred construction, the filter element comprises a single, unitary construction in an easily employable form, such as a bag. In this way, the rapid installation of the filter in position, lining the inside surface of the rotatable drum is achieved, while also allowing the filter to be quickly and easily removed from the drum, containing the desired filtered precious metal.

In addition if the rotatable drum is opened at one end, a cover is also employed which cooperates with the drum, while not interferring with the rotation of the drum. Also, a centrally disposed portal is preferably formed in the cover in order to allow the solution to be poured quickly and easily into the drum prior to filtration. In its preferred construction, the cover incorporates a ramped, sloping surface, sloping downwardly from the outside edge towards the centrally disposed portal, thereby allowing the liquid to be poured onto the surface of the cover, and flow into the receiving portal.

The housing of the present invention preferably incorporates a drainage port through which the filtered liquid exits the housing and, through a suitable length of tubing, is delivered to a sink or suitable drain system for disposal.

In an alternate embodiment, the rotatable drum incorporates a plurality of ribs extending radially from the inside wall of the rotatable drum, with each rib incorporating a filter supporting surface at its terminating end. In addition, the rotatable drum incorporates a plurality of fluid transfer holes between the ribs or, if desired, a plurality of holes on only the base of the rotatable drum.

With this construction, when filtration is desired, the filter is placed inside the rotatable drum in intimate contact with the terminating ends of the radial fins. Once the drum is rotating, the liquid is driven through the filter and either exits the drum through the holes formed between the fins or drips down onto the base of the drum, exiting the drum through the holes in the base. Once all of the liquid has been driven from the drum, the filter element can be removed with the desired precious metal contained thereon.

The invention accordingly comprises the features of construction, combinations of elements and arrangement of parts which will be exemplified in the constructions hereinafter set forth, and the scope of the invention will be indicated in the claims.

THE DRAWINGS

For a fuller understanding of the nature and objects of the invention, reference should be had to the following detailed description taken in connection with the accompanying drawings, in which:

FIG. 1 is a perspective view partially in cross-section of one embodiment of the precious metal recovery apparatus of this invention;

DETAILED DESCRIPTION

Figure 4:
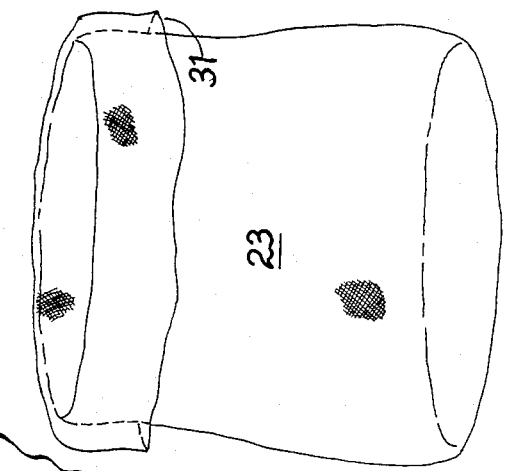
FIG. 4 is a perspective view showing a typical filter bag construction employed in the present invention.

In FIG. 1, precious metal recovery apparatus 20 of the present invention is shown in its preferred embodiment, incorporating a support housing 21, a perforate, rotatable drum 22, and a filter element 23. In addition, precious metal recovery apparatus 20 also incorporates a cover 24, and a motor 25 drivingly engaged with rotatable drum 22.

With these components, a highly effective and efficient precious metal recovery apparatus 20 is attained, which is capable of filtering any desirable precious metal from otherwise waste solutions in a manner which is quick and easy to use. Furthermore, the filtration is achieved in a non-reactive fashion, without requiring the user to employ chemicals or conduct various chemical reactions in order to attain the desired precious metal recovery.

As shown in FIG. 1, rotatable drum 22 preferably comprises the unitary vessel formed by substantially cylindrically shaped side walls 27 and a substantially flat base 28, unitarily engaged with side wall 27 at one end thereof. In addition, drum 22 incorporates a plurality of holes 26 formed throughout side walls 27 and base 28.

Although the size, quantity, and position of holes 26 may be varied widely, without departing from the scope of the present invention, holes 26 must comprise a sufficient diameter and a sufficient quantity in order to assure the quick, trouble-free passage of the solution from the inside of drum 22 to the outside thereof. However, holes 26 must also comprise a small enough diameter to prevent filter 23 from being extruded through holes 26 from the centrifugal forces acting thereon during the rotation of drum 22.

In general, it has been found that holes 26 preferably comprise a diameter of between about one-eighth and one-quarter inches and are formed in both walls 27 and base 28 of rotatable drum 22. With this construction, the desired rapid filtration of the solution through filter 23 and holes 26 during the rotation of drum 22 is effectively and efficiently attained.

In this preferred construction, drum 22 also incorporates an annular ring or boss 29 formed about the outside surface of wall 27. Boss 29 cooperates with a flexible, elastic holder 30 which peripherally surrounds the terminating edge of filter 23, thereby securely fastening filter 23 in position.

As is more fully detailed below, filter 23 preferably comprises a unitary, bag-like construction with a terminating edge which folds over rotatable drum 22 with its terminating edge positioned about the outside surface of wall 27. In this way, filter 23 can be quickly and easily inserted into rotatable drum 22 and affixed in position by elastic holder 30, cooperating with boss 29.

In its preferred construction, drum 22 is completely open at the end opposite base 28. In this way, the entire interior surface of drum 22 is readily accessible through the open end, thereby assuring and assisting in the ease of installation and positioning of filter 23. As best seen in FIG. 4, filter 23 preferably comprises a bag-like or envelope-like configuration. With this configuration, filter 23 is easily placed inside rotatable drum 22, with filter 23 contacting the inside surfaces of substantially cylindrical walls 27 and base 28 of drum 22, as depicted in FIG. 1 with the terminating edge of filter 23 folded over the drum's open edge to the outside surface of drum 22.

In the preferred embodiment of the precious metal recovery apparatus 20 of this invention, drum 22 is rotationally driven by motor 25. Motor 25 is securely mounted to housing 21 by support flanges 33, and incorporates a rotating shaft 32 which extends from motor 25 and drivingly engages drum 22. Preferably, shaft 32 is secured to base 28 of drum 22 by screw means 37. In this way, when motor 25 is energized, shaft 32 rotates and drum 22 is simultaneously rotationally driven therewith.

It has been found that motor 25 preferably drives drum 22 at between about fifty and one hundred revolutions per minute. With this rotational speed, the desired centrifugal forces are generated to cause the solution contained in rotatable drum 22 to be forced through filter 23 and through holes 26 into housing 21. In addition, with filter 23 having the desired micron size, the precious metal is retained within rotatable drum 22 while the metal-free liquid is removed.

The preferred construction of precious metal recovery apparatus 20 also comprises cover 24 which is easily engaged with housing 21, while not interferring with the rotation of drum 22. Preferably, cover 24 incorporates an enlarged, centrally disposed aperture 38 which is positioned in juxtaposed, overlying, cooperating relationship with the interior or rotatable drum 22, when cover 24 is mounted to housing 21. In this way, the liquid to be filtered can be easily poured through aperture 38, directly into rotatable drum 22.

Top surface 39 of cover 24 is preferably constructed in an overall, sloping, ramped configuration, with the ramp angle sloping downwardly as one moves from the outer edge of cover 24 to centrally disposed aperture 38. In this way, the solution to be filtered can be easily poured onto surface 39 of cover 24, with the solution being carried by gravitational forces to aperture 38 and into rotatable drum 22.

Although cover 24 may comprise any configuration and may, if desired, be completely eliminated without departing from the scope of the invention, the use of cover 24 is preferred in order to prevent unwanted splashing of the solution to be filtered while it is being added to rotatable drum 22, as well as preventing any unwanted splashing of the solution during the filtration process. Of course, the actual configuration of cover 24, if employed, would depend upon the configuration of housing 21, since cover 24 must cooperatingly engage with housing 21 to be most effective.

In its preferred construction, housing 21 comprises an upper, drum-containing portion 41 and a lower, support portion 42. Upper, drum-containing portion 41 is defined by a substantially cylindrically shaped wall member 44 and a cooperating base 45, which is matingly engaged with one terminating end of cylindrically shaped wall member 44.

Although upper, drum-containing portion 41 of housing 21 can be constructed in a plurality of alternate configurations, the preferred embodiment as shown in FIG. 1, comprises a substantially cylindrical shape which peripherally surrounds and substantially envelopes drum 22, thereby providing the desired cooperation therewith.

Lower support portion 42 of housing 41 is preferably defined by a substantially truncated conically shaped wall 46. Truncated conical wall 46 terminates at its smaller diameter end with base 45 of upper portion 41. In this way, wall 46 provides the desired support for upper portion 41 and drum 22.

In addition, motor supporting flanges 33 are mounted to base 45 between truncated conical wall 46 to provide a convenient, secure supporting location for motor 25. Although upper, drum-containing portion 41 could be supported in a plurality of alternate configurations, the use of truncated conical wall 36 is preferred in order to provide an aesthetically pleasing appearance, while also providing an area wherein motor 25 is protected from unwanted handling or tampering.

As shown in FIG. 1, base 45 incorporates an outlet port 48 which extends downwardly from base 45 substantially parallel to motor supporting flanges 33. In addition, a flexible drainage tube 49 is secured to outlet port 48, extending therefrom to a suitable sink or other drainage area.

Conically shaped wall 46 preferably incorporates a cutout zone 50 through which tubing 49 extends, thereby increasing the aesthetic appearance of precious metal recovery apparatus 20 by concealing motor 25, drainage hose 49, flanges 33 and port 48, all of which are contained within peripherally surrounding conically shaped wall 46. In addition, as shown in FIG. 1, a second cut-out zone 51 is preferably incorporated in wall 46 in order to provide for the electrical wire connected to motor 25 to extend therefrom to a suitable electrical outlet. Preferably, a motor controlling on/off switch (not shown) is mounted on wall 46 for ease of operation.

In its preferred embodiment, base 45 incorporates a centrally disposed raised portion 52 which incorporates a hole 53 through which shaft 32 of motor 25 extends to its engaged position with drum 22. Raised portion 52 is incorporated into base 45 in order to channel all of the filtered solution towards drainage port 48, while preventing any of the solution from passing through hole 53 onto motor 25.

In order to employ precious metal recovery apparatus 20 of the present invention, an operator need only remove cover 24 from housing 21 and install unitary filter 23 in position within drum 22. Since filter 23 preferably comprises a unitary, bag-like configuration, the entire interior surface of drum 22 is quickly and easily covered by filter 23 by placing filter 23 in drum 22 and folding the outer edge of filter 23 about the open edge of drum 22 onto the outer surface of drum 22 below ridge 29. If employed, elastic member 30 is placed about the terminating edge of filter 23, thereby assuring filter 23 is maintained in the desired position.

With filter 23 secured in place, cover 24 is placed into engagement with housing 21. Then, the operator switches the motor into an "on" position by a switch member (not shown), which energizes motor 25. With motor 25 energized, shaft 32 rotates at the desired speed, causing drum 22 to rotate simultaneously therewith.

With drum 22 rotating about its central axis, which coincides with the axis of shaft 32, the solution to be filtered is poured onto ramped surface 39 of cover 24. Since surface 39 ramps downwardly toward portal 38, the solution is carried by gravitational forces through portal 38 and into the filter lined, rotating drum 22.

The centrifugal forces caused by the rotation of drum 22 forces the solution contained within drum 22 to pass through filter 23 and holes 26. However, since the precious metal contained in the solution comprises a size greater than the micron size of filter 23, the precious metal is retained within drum 22.

When the filtered liquid passes through holes 26 of drum 22, the liquid enters the toroidal zone 35 formed between the outside wall of drum 22 and the inside wall of upper portion 41. Once the liquid is forced into toroidal zone 35, the centrifugal forces cease to act upon the liquid since only drum 22 is rotating. Consequently, gravitational force takes over causing the liquid to fall onto the top surface of base 45. As the liquid level increases on base 45 and covers base 45, the liquid passes through outlet port 48 and through drainage tube 49 to a desired drainage area. Of course, if desired, base 45 may incorporate a gentle sloped surface in order to assure the complete drainage of all of the liquid from base 45 and through outlet port 48.

Once all of the liquid has been centrifugally forced out of drum 22 through filter 23 and holes 26, motor 25 is switched off, stopping the rotation of drum 22. Then, cover 24 is removed and the precious metal retained in drum 22 by filter 23 is moved for reclamation.

Although the recovered precious metal can be reclaimed in a variety of well-known ways, the bag-like or envelope-like configuration of filter 23 allows the user to merely seal the open end of filter 23 with an elastic or tie member, and send filter 23 with the precious metal contained therein to a commercial reclamation center.

As is readily apparent from the preceding description, by employing the precious metal recovery apparatus 20 of this invention, precious metal can be quickly, easily and effectively recovered from solutions with little or no training being required by the operator. With very simple instructions, any operator can quickly and easily employ apparatus 20 of this invention with complete confidence that all of the desired precious metal is effectively and efficiently recovered, while all of the filtered solution is automatically carried out of apparatus 20 to the desired disposal area.

As shown in FIG. 4, filter 23 preferably comprises a one-piece bag configuration comprising an overall diameter generally conforming to the inside diameter of drum 22. In this way, filter 23 can be easily inserted into drum 22 directly adjacent the inside surfaces thereof. In addition, bag 23 comprises a vertical depth which is greater than the height of drum 22. In this way, filter 23 is folded over the top open edge of drum 22, with terminating edge 31 of filter 23 being positioned on the outside surface of drum 22, thereby assuring the securement of filter 23 about all of the interior surfaces of drum 22.

Although any suitable filter material can be employed, filter 23 preferably comprises a polyester monofilament cloth having a mesh opening of between about 385 and 450 microns. Of course, the particular micron size required for a particular application depends upon the size of the precious metal being filtered from a solution.

Although any type of polyester monofilament stencil or screen cloth meeting the requirements detailed above would be sufficient to employ in the present invention, one such polyester monofilament cloth which has been employed and has been found to be effective is "NBC" polyester monofilament stencil cloth distributed by Naz-Dar Company of New York, Inc., 45 39th St., Long Island City, N.Y. 11104. The polyester monofilament cloth meeting the requirements of the present invention are distributed by Naz-Dar Company of New York, Inc. as stencil cloth No. 450, No. 420, No. 400, and No. 385.

Although monofilament polyester screen cloth or stencil cloth is preferred, filter 23 may also be manufactured from a web of fiberglass strands and microfibers containing flexible acrylic binders.

In employing precious metal recovery apparatus 20 of the present invention, the user preferably employs, chemical additives in order to assist in the precipitation of the precious metal to be recovered. In this regard, chemicals such as zinc powder may be added to the solution, preferably before the solution is poured into drum 22.

Figure 2:
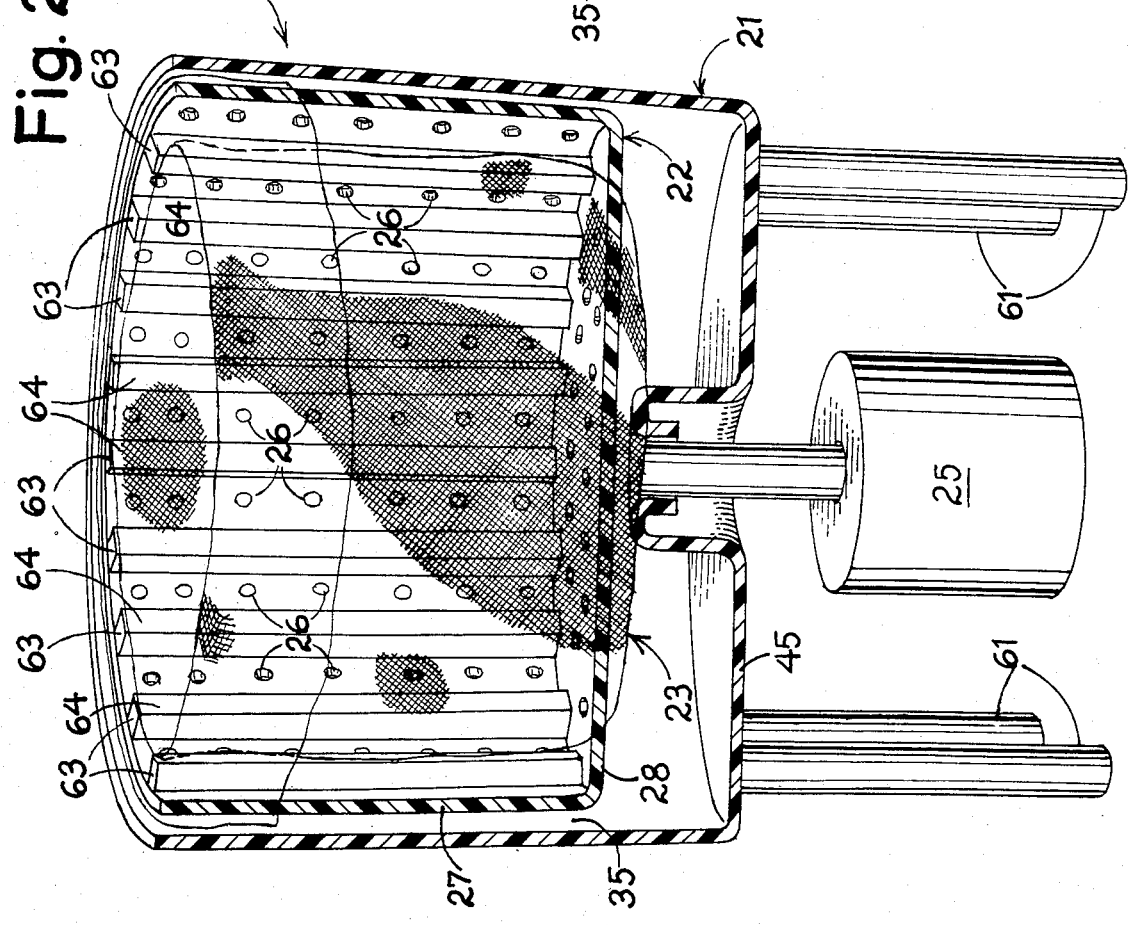
FIG. 2 is a perspective view partially in cross-section of an alternate embodiment of the precious metal recovery apparatus of the present invention.

In FIG. 2, an alternate embodiment of precious metal recovery apparatus 20 of the present invention is shown. In this embodiment, precious metal recovery apparatus 20 incorporates a housing 21, a perforate, rotatable drum 22, a filter element 23 and a motor 25 drivingly engaged with rotatable drum 22.

In this alternate embodiment, housing 21 is supported by a plurality of legs 61 which are mounted to the base of housing 21. In this way, both housing 21 and rotatable drum 22 are supportingly maintained in cooperating relationship.

The major variation depicted in the alternate embodiment of FIG. 2 is the incorporation of a plurality of fins 63 which extend radially inwardly from the inside surface of rotatable drum 22, and terminate with substantially flat surfaces 64. In the preferred embodiment, rotatable drum 22 is perforated with a plurality of holes 26 which are positioned between radially extending fins 63. In addition, base 28 of rotatable drum 22 is also perforated with a plurality of holes 26.

By employing this embodiment, filter 23 when positioned in rotatable drum 22 comes into abutting contact with the substantially flat terminating surfaces 64 of radially extending fins 63. By incorporating the plurality of fins 63 about the entire inside surface of rotatable drum 22, filter 23 is maintained inwardly of sidewall 27 of drum 22, in juxtaposed, spaced, cooperating relationship therewith. As a result, direct contact of filter 23 with holes 26 and wall 27 of drum 22 is avoided, thereby preventing any possibility of clogging holes 26 or otherwise adversely interfering with the flow of the filtered solution from the inside of rotatable drum 22 to the outside thereof.

Once the filtered solution has entered into toroidal zone 35 between rotatable drum 22 and housing 21, gravitational forces cause the filtered solution to fall onto base 45 of housing 21 and, ultimately, to a drainage port (not shown). In this way, the desired filtration of the precious metal and disposal of the filtered solution is achieved with equal efficacy and ease as detailed above.

If desired, holes 26 may be eliminated from wall 27 between fin 63, with the filtered solution exiting rotating drum 22 through holes 26 formed in base 28 of drum 22. However, the preferred embodiment incorporates holes 26 in both walls 27 and base 28.

Figure 3:
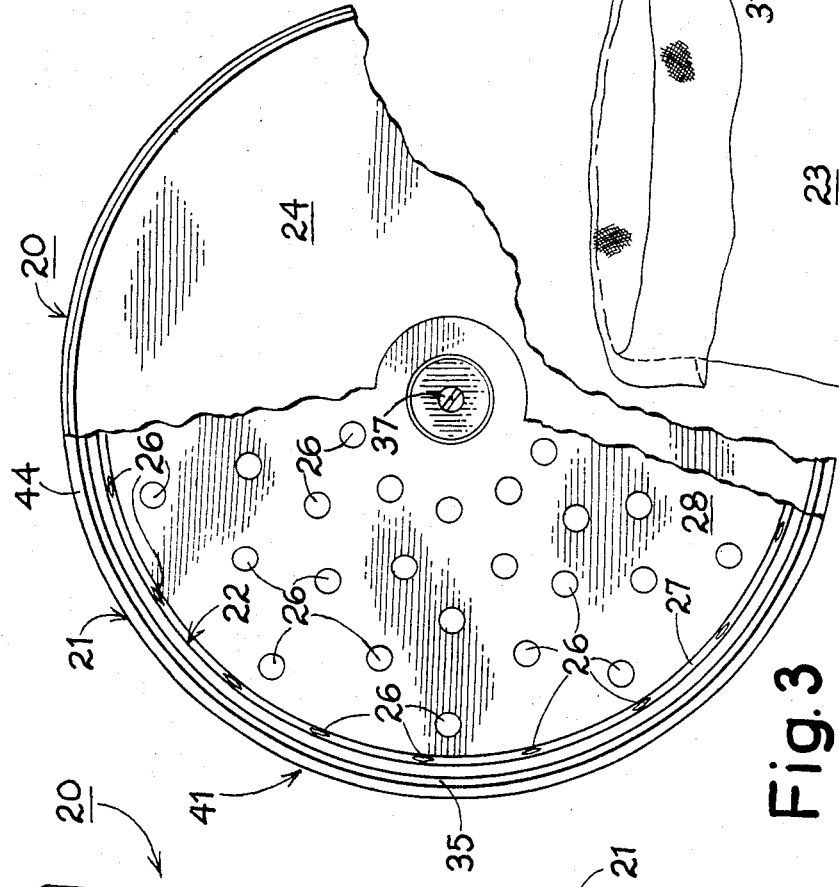
FIG. 3 is a top plan view, partially broken away, showing the precious metal recovery apparatus of the present invention as depicted in FIG. 1.

In FIG. 3, a top plan view of the preferred embodiment of precious metal recovery apparatus 20 of the present invention is shown, with cover 24 partially broken away, and without filter element 23 positioned in place. As clearly shown in FIG. 3, sidewall 27 of rotatable drum 22 tapers inwardly as one moves from the top of wall 27 to bottom surface 28 of drum 22.

By providing drum 22 with an inwardly sloping taper, additional area between drum 22 and upper, drum-containing portion 41 of housing 21 is achieved. As a result, toroidal zone 35 between drum 22 and housing 21 increases near the base of drum 22, where additional area is required for the flow of the filtered solution. Consequently, the ease of operation and efficiency of the present invention is further enhanced.

It will thus be seen that the objects set forth above, among those made apparent from the preceding description, are efficiently attained and, since certain changes may be made in carrying out the above process and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for removing particles of precious metal from suspension in an aqueous carrier comprising:
   A. a perforate vessel supportingly mounted for rotation about an axis thereof and comprising
      1. a substantially cylindrical drum mounted for rotation about the central axis thereof, with the lower end of the drum being closed by a base member and the upper end of the cylinder being open for ease of access, and
      2. a plurality of holes formed throughout the cylindrical walls and base member thereof;
   B. a housing peripherally surrounding a major portion of the perforate vessel and supportingly maintaining the perforate vessel for rotation therein;
   C. filter means comprising
      1. a bag-like configuration having a diameter substantially equal to the diameter of the cylindrical vessel and an overall top-to-bottom depth at least substantially equal to the depth of the cylindrical vessel for completely covering in overlying relationship both the walls and the base of said perforate vessel, and being removably positionable in cooperating relationship with the entire inside surfaces of the perforate vessel, and
      2. a pore size which prevents the precious metal particles from passing therethrough, while allowing the aqueous carrier to pass therethrough; and
   D. drive means
      1. supportingly mounted to the housing, and
      2. drivingly engaged with the perforate vessel for controlled rotation thereof;
   whereby upon rotation of the perforate vessel with a precious metal containing aqueous carrier contained therein, the aqueous carrier is forced through the filter means and the walls of the vessel for disposal, while the precious metal is retained directly within the filter means for recovery.

2. The precious metal recovery apparatus defined in claim 1, wherein said filter means is further defined as being formed from polyester monofilament cloth material having a pore size ranging between about 385 and 450 microns.

3. The precious metal recovery apparatus defined in claim 1, wherein said housing is further defined as comprising a substantially cylindrical shape having a diameter greater than the diameter of the perforate vessel and further comprising a removable cover member securable to the housing without interfering with the rotation of the perforate vessel.

4. The precious metal recovery apparatus defined in claim 3, wherein said cover is further defined as comprising
   1. a downwardly sloping top surface terminating in a central aperture, and
   2. said central aperture being substantially aligned with the central axis of the perforate vessel when the cover is mounted to the housing,
   thereby providing a system wherein the precious metal containing aqueous carrier can be quickly and easily poured onto the top surface of the cover and flow into the perforate vessel through the central aperture by gravity.

5. The precious metal recovery apparatus defined in claim 1, said housing is further defined as being mounted at its base to a truncated conical support member which surrounds and protects the drive means, thereby providing a fully contained, easily portable unit readily movable to any desired location.

6. The precious metal recovery apparatus defined in claim 1, wherein said perforate vessel is further defined as comprising a plurality of fin members radially extending inwardly from the inside surface of the substantially cylindrical wall, with each of said fin members incorporating a substantially flat terminating end surface for cooperative supporting engagement with the filter means.

7. Apparatus for removing particles of precious metal from suspension in an aqueous carrier comprising:
   A. a housing;
   B. an open ended drum supportingly mounted within the housing for rotation, said drum comprising
      1. a substantially cylindrical side wall,
      2. a base plate mounted to the lower end of the cylindrical side wall, closing said lower end, and
      3. a plurality of holes formed in said cylindrical side wall and said base plate;
   C. a motor supportingly mounted to the housing and operatively connected to the drum for controlled rotation thereof about the central axis of the cylindrical drum;
   D. filter means comprising a bag-like or envelope-like configuration having a single open end and being removably positionable in cooperating relationship with both the inside wall and the base surfaces of the perforate rotatable drum and incorporating a pore size for preventing the precious metal particles from passing therethrough, while allowing the aqueous carrier to pass therethrough; and
   E. a cover
      1. removably mountable to the housing in cooperating relationship with the open-ended rotatable drum and
      2. incorporating a downwardly sloping surface terminating in a substantially centrally disposed aperture, positioned for cooperating relationship with the rotatable drum;
   whereby the drum can be rotated when desired and the aqueous carrier, incorporating precious metal particles, can be poured onto the surface of the cover and carried into the rotatable drum through the central aperture by gravity and, once within the rotating drum, the aqueous carrier is forced through the filter means and the holes of the drum by centrifugal forces while the precious metal particles are retained within the drum by the filter means.

8. The precious metal recovery apparatus defined in claim 7, wherein said filter means is formed from polyester monofilament cloth material having a pore size between about 385 and 450 microns.

* * * * *